K. SATZINGER.
SPRING JOURNAL BEARING.
APPLICATION FILED SEPT. 6, 1912.

1,071,183.

Patented Aug. 26, 1913.

Witnesses:
H. Moureau
S. Swanson

Inventor
Karl Satzinger
by
B. Singer
Attorney

UNITED STATES PATENT OFFICE.

KARL SATZINGER, OF NUREMBERG, GERMANY, ASSIGNOR TO HANS HELD, OF NUREMBERG, GERMANY.

SPRING JOURNAL-BEARING.

1,071,183. Specification of Letters Patent. Patented Aug. 26, 1913.

Application filed September 6, 1912. Serial No. 718,998.

*To all whom it may concern:*

Be it known that I, KARL SATZINGER, of Nuremberg, Bavaria, Germany, have invented an Improvement in or Relating to Spring Journal-Bearings, of which the following description, in connection with the accompanying drawing, is a specification.

This invention relates to a spring journal bearing chiefly for centrifugal machines. It differs from the known constructions by two fixed superposed annular disks springing against each other and receiving between them an annular flange of wedge shaped cross-section provided in the box of the journal bearing. The result of this construction is that the spindle is forced back into the central position, and on the other hand the journal bearing can spring easily in vertical direction so that there is obtained a free adjustment of the bearing box even in the case of pressure directed laterally downward or upward.

Figure 1:
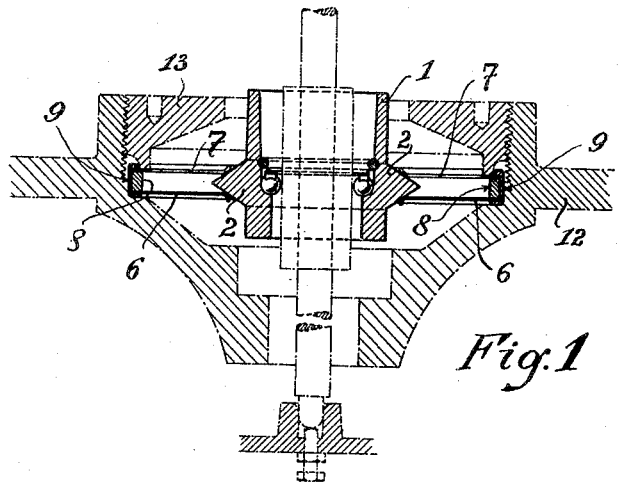
Figure 2:
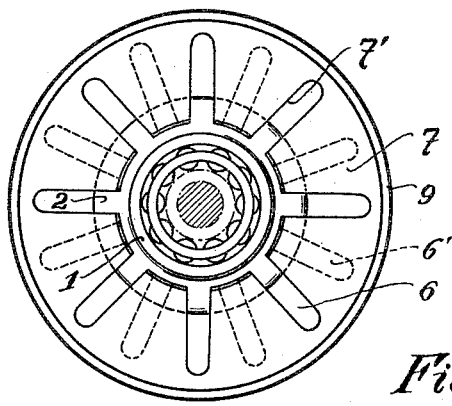
Figure 3:
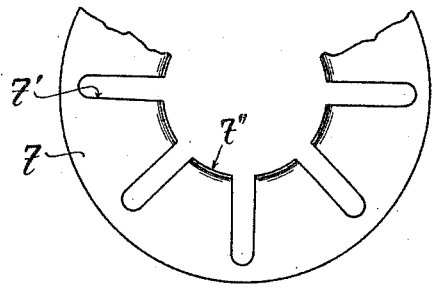

A construction of the journal bearing according to this invention is illustrated by way of example in Figures 1 to 3 in which:—

Fig. 1 shows the journal bearing in longitudinal section; Fig. 2 in plan, while Fig. 3 is a portion of a metal spring disk used.

The bearing box 1 carries an annular flange 2 of wedge shaped cross-section by means of which it engages between two metal disks 6, 7, springing against each other. As shown in Fig. 3, the latter are provided with a central perforation corresponding to the diameter of the bearing box, and with radial slots 7' which subdivide the disk. The inner edge of the plates is rounded off upward or downward, so that an easy adjustment of the annular flange 2 of the bearing brasses 1 is insured. For retaining a suitable distance between the two spring disks, a ring 8 is inserted between them. The two disks 6, 7, and the intermediate ring 8 could be connected together by means of an edge setting frame 9.

12 is the base of the machine and 13 is a screwed ring which keeps the rings in place.

Having now particularly described and ascertained the nature of my said invention and in what manner the same is to be performed, I declare that what I claim is:—

1. In a spring journal bearing, the combination of a bearing sleeve, a ring of wedge shaped cross section on said sleeve, two superposed resilient disks, one of said disks engaging the upper surface of said ring and the other disk engaging the lower surface of the same, and means for holding said disks at a definite distance from each other.

2. In a spring journal bearing, the combination of a bearing sleeve, a ring of wedge shaped cross section on said sleeve, two superposed resilient disks, one of said disks engaging the upper surface of said ring and the other disk engaging the lower surface of the same, and means for holding said disks at a definite distance from each other, said disks being provided with radial slots extending to their marginal portion.

In testimony whereof I affix my signature in presence of two witnesses.

KARL SATZINGER.

Witnesses:
 GEORG ZEITNER,
 RALPH W. DOX.

Copies of this patent may be obtained for five cents each, by addressing the "Commissioner of Patents, Washington, D. C."